(12) United States Patent
Purtell et al.

(10) Patent No.: US 7,478,115 B2
(45) Date of Patent: Jan. 13, 2009

(54) SYSTEM AND METHOD FOR DATABASE AND FILESYSTEM COORDINATED TRANSACTIONS

(75) Inventors: Michael J. Purtell, Bellevue, WA (US); Rajeev B. Rajan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/151,378

(22) Filed: Jun. 13, 2005

(65) Prior Publication Data

US 2006/0282478 A1    Dec. 14, 2006

(51) Int. Cl.
*G06F 17/30* (2006.01)
(52) U.S. Cl. .................... 707/202; 707/1; 707/102
(58) Field of Classification Search ............. None
See application file for complete search history.

(56) References Cited

U.S. PATENT DOCUMENTS

| | | | |
|---|---|---|---|
| 6,119,129 A * | 9/2000 | Traversat et al. ............ 707/202 |
| 6,564,215 B1 * | 5/2003 | Hsiao et al. ..................... 707/8 |
| 6,728,958 B1 * | 4/2004 | Klein et al. ................. 718/101 |
| 7,100,195 B1 * | 8/2006 | Underwood ................... 726/2 |
| 7,130,874 B2 * | 10/2006 | Makansi et al. ............. 707/204 |
| 7,159,024 B2 * | 1/2007 | Mitsuoka et al. ............ 709/225 |
| 7,206,805 B1 * | 4/2007 | McLaughlin, Jr. .......... 709/203 |
| 2001/0013040 A1 * | 8/2001 | Baumeister et al. ......... 707/201 |
| 2002/0174103 A1 * | 11/2002 | Hsiao et al. ..................... 707/1 |
| 2004/0133591 A1 * | 7/2004 | Holenstein et al. .......... 707/102 |
| 2004/0148308 A1 * | 7/2004 | Rajan et al. ................. 707/102 |
| 2005/0262182 A1 * | 11/2005 | Thole ......................... 709/200 |

* cited by examiner

*Primary Examiner*—Christian P. Chace
*Assistant Examiner*—Bai D. Vu
(74) *Attorney, Agent, or Firm*—Woodcock Washburn LLP

(57) ABSTRACT

The atomicity of a transaction is extended to a filesystem as well as a database, meaning that, when the transaction is complete, all changes within the transaction to both the database and the filesystem will be either committed or not committed. Interactions may be coordinated among a client, a database resource manager, a filesystem resource manager, and a transaction manager.

9 Claims, 12 Drawing Sheets

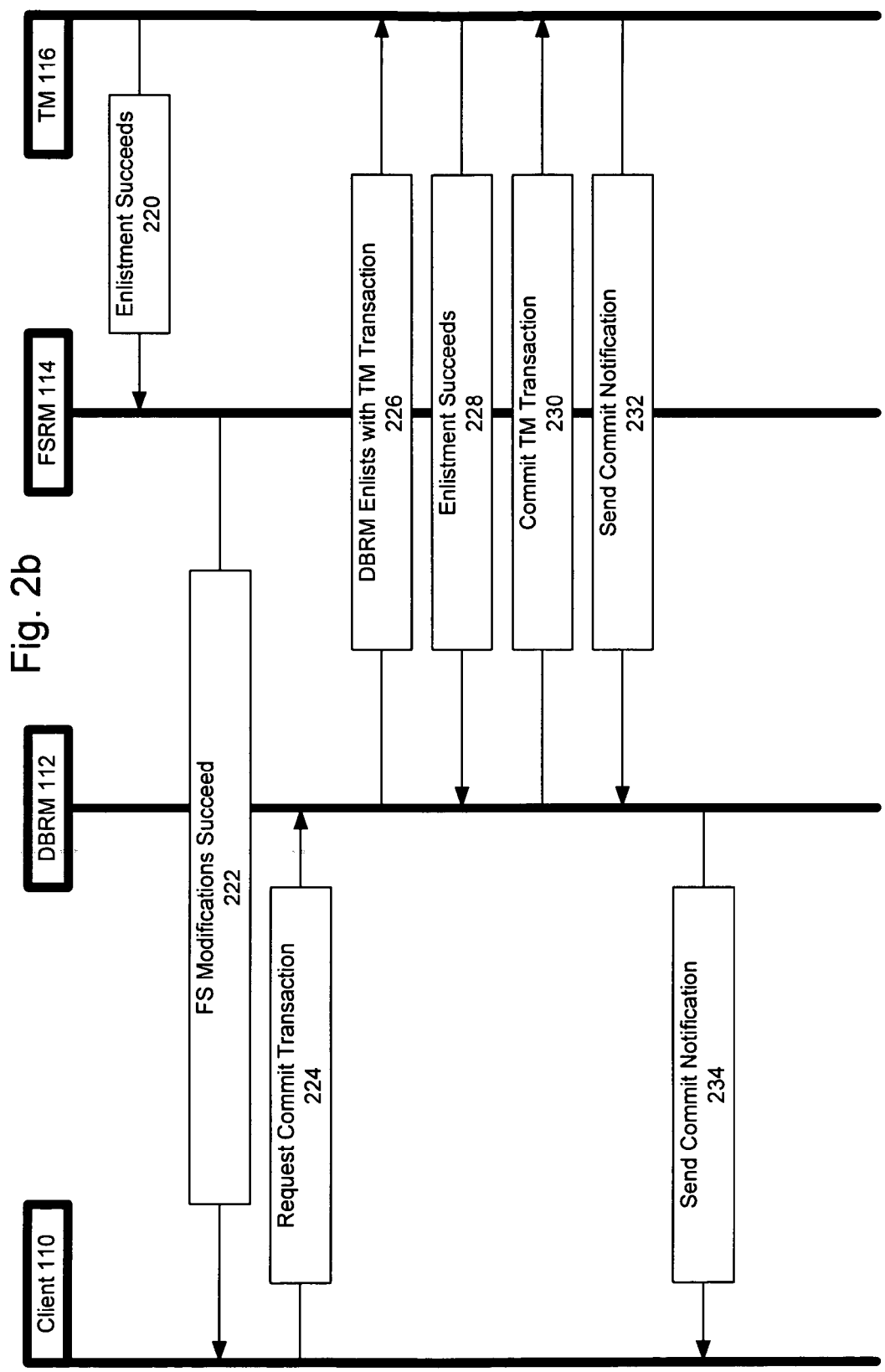

Fig. 4

| Action Table 400 ||||| 
| Input/Current State | NewState | OpenXactState | CommitState | RollbackState |
| --- | --- | --- | --- | --- |
| PreparedInput | OpenXactAction | NothingAction | NothingAction | NothingAction |
| RecoverInput | OpenXactAction | NothingAction | NothingAction | NothingAction |
| CommitInput | AssertAction | SetEventAction | AssertAction | AssertAction |
| RollbackInput | AssertAction | SetEventAction | AssertAction | AssertAction |
| RmRecoveredInput | NothingAction | NothingAction | CompleteCommitAction | NothingAction |
| RecoveredRecoverInput | OpenXactAction | NothingAction | AssertAction | AssertAction |
| RecoveredCommitInput | AssertAction | CompleteCommitAction | AssertAction | AssertAction |
| RecoveredRollbackInput | AssertAction | NothingAction | AssertAction | AssertAction |
| PruShuttingDownInput | NothingAction | NothingAction | NothingAction | NothingAction |
| LastRecoverInput | NothingAction | NothingAction | NothingAction | NothingAction |

Fig. 5

| Next State Table 500 ||||||
|---|---|---|---|---|
| Input/Current State | NewState | OpenXactState | CommitState | RollbackState |
| PreparedInput | OpenXactState | OpenXactState | CommitState | RollbackState |
| RecoverInput | OpenXactState | OpenXactState | CommitState | RollbackState |
| CommitInput | NewState | CommitState | CommitState | RollbackState |
| RollbackInput | NewState | RollbackState | CommitState | RollbackState |
| RmRecoveredInput | DestroyState | OpenXactState | DestroyState | DestroyState |
| RecoveredRecoverInput | OpenXactState | OpenXactState | CommitState | RollbackState |
| RecoveredCommitInput | NewState | DestroyState | CommitState | RollbackState |
| RecoveredRollbackInput | NewState | DestroyState | CommitState | RollbackState |
| PruShuttingDownInput | DestroyState | DestroyState | DestroyState | DestroyState |
| LastRecoverInput | NewState | OpenXactState | CommitState | RollbackState |

Fig. 6

| STATE SYMBOL TABLE 600 ||
|---|---|
| State Symbol | Description |
| NewState | The initial state machine state - the transaction has not been opened. |
| OpenXactState | The transaction has been opened and enlisted with TM 116 |
| CommitState | The outcome of the transaction has been determined to be committed. |
| RollbackState | The outcome of the transaction has been determined to be rolled back. |
| DestroyState | Pseudo state that indicates the transaction should be removed from the list and destroyed after completing the action. |

Fig. 7

| INPUT SYMBOL TABLE 700 ||
|---|---|
| Input Symbol | Description |
| PreparedInput | Processing transaction prepare information from a transaction log of DBRM 112 |
| RecoverInput | Received notification from TM 116 of an in-doubt transaction. |
| CommitInput | Received notification from TM 116 that the transaction should be committed. |
| RollbackInput | Received notification from TM 116 that the transaction should be rolled back. |
| RmRecoveredInput | DBRM 112 recovery has just completed. |
| RecoveredRecoverInput | Received (after recovery completed from DBRM 112) notification from TM 116 of an in-doubt transaction. |
| RecoveredCommitInput | Received (after recovery completed from DBRM 112) notification from TM 116 that the transaction should be committed. |
| RecoveredRollbackInput | Received (after recovery completed from DBRM 112) notification from TM 116 that the transaction should be rolled back. |
| PreShuttingDownInput | DB 113 is shutting down. |
| LastRecoverInput | TM 116 has no remaining in-doubt transactions |

Fig. 8

| ACTION SYMBOL TABLE 800 ||
|---|---|
| Action Symbol | Description |
| OpenXactAction | Create a new transaction object to track an in-doubt transaction. |
| Assert Action | Fire an assert due to an invalid combination of state and input. |
| NothingAction | No action. The next state may be different, but there is no current action to take. |
| SetEventAction | Set an event on the transaction object to indicate that an outcome has been determined for the transaction. |
| CompleteCommitAction | Inform TM 116 that the outcome of the transaction has been recorded. |

SYSTEM AND METHOD FOR DATABASE AND FILESYSTEM COORDINATED TRANSACTIONS

FIELD OF THE INVENTION

The present invention relates to the field of data storage and manipulation, and, more specifically, to coordination of transactional consistency between a database and a filesystem.

BACKGROUND OF THE INVENTION

For many applications, it is advantageous to store their associated data in both a database and a filesystem. For example, many applications will have their smaller and more structured data stored in a database and will have their larger and less structured data stored in a filesystem. Such larger and less structured data may include, for example, pictures, photographs, other video content, audio content, and the like. When data is distributed between a database and a filesystem, the data may be logically organized in the database (e.g. as a column in a data table) and physically stored in the filesystem. There are a number of reasons that this distribution of data between a database and a filesystem is advantageous. For example, reading and writing large unstructured data generally cannot be performed as efficiently with a database as with a filesystem. Also, the size of some data collections may simply exceed what a database server can accommodate.

One of the services that databases provide is that of a transaction. A transaction pertains to changes made to one or more resources. A transaction provides for atomicity, consistency, isolation and durability. The term atomicity refers to the ability to make changes such that when a transaction is completed, all changes within the transaction are either committed or not committed. If the transaction is not committed, then all changes within the transaction may be rolled back or one or more conflict resolution techniques may be employed to resolve conflicts between the changes within the transaction and other changes.

Unlike databases, filesystems traditionally have not offered transactional services. Thus, a number of problems may arise when an application attempts to change its data that is stored in both a database and a filesystem. For example, certain changes may be made to documents stored in the filesystem without making corresponding changes to information stored in the database. In this scenario, the application is burdened with the tasks of detecting and fixing these inconsistencies. Accordingly, there is a need in the art for systems and methods for coordinating transactions involving data that is stored in both a database and a filesystem.

SUMMARY OF THE INVENTION

The present invention is directed to systems and methods for database and filesystem coordinated transactions. The atomicity of a transaction is extended to the filesystem as well as the database, meaning that, when the transaction is complete, all changes within the transaction to both the database and the filesystem will be either committed or not committed. Interactions may be coordinated among a client, a database resource manager, a filesystem resource manager, and a transaction manager.

According to an aspect of the invention, a lazy binding process may be employed, in which the initiation of the transaction with the transaction manager is delayed until the database resource manager receives an indication that the transaction will involve at least some filesystem data. The lazy binding process avoids unnecessary enlistment with the transaction manager and also avoids the complexity involved with trying to predict whether the transaction will involve filesystem data.

According to another aspect of the invention, transactional interactions may vary depending on whether the transaction occurs in an in-band or an out-of-band scenario. In the out-of-band scenario, the client interacts directly with the filesystem resource manager, while, in the in-band scenario, the database resource manager serves as a conduit between the client and the filesystem resource manager, submitting modifications to the filesystem resource manager on behalf of the client. These dual sets of interactions provide support and extensibility for applications which are not configured to interact with the filesystem, while also providing applications greater efficiency for applications which are capable of interacting directly with the filesystem.

According to another aspect of the invention, a unique transaction manager may be designated to manage transactions for each particular database. The use of a single transaction manager for each database enables each database to be recovered and restored independently of other databases.

According to another aspect of the invention, a state machine driven process may be employed to resolve in-doubt transactions during the recovery process. The state machine driven recovery process resolves independent simultaneous and asynchronous recovery information that may be generated by both the database resource manager and the transaction manager.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIGS. 2a-b depict a flowchart of an exemplary method for performing an out-of-band coordinated transaction in accordance with the present invention;

FIG. 4 depicts an exemplary action state table in accordance with the present invention;

FIG. 5 depicts an exemplary next state table in accordance with the present invention;

FIG. 6 depicts an exemplary state symbol table in accordance with the present invention;

FIG. 7 depicts an exemplary input symbol table in accordance with the present invention;

FIG. 8 depicts an exemplary action symbol table in accordance with the present invention;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
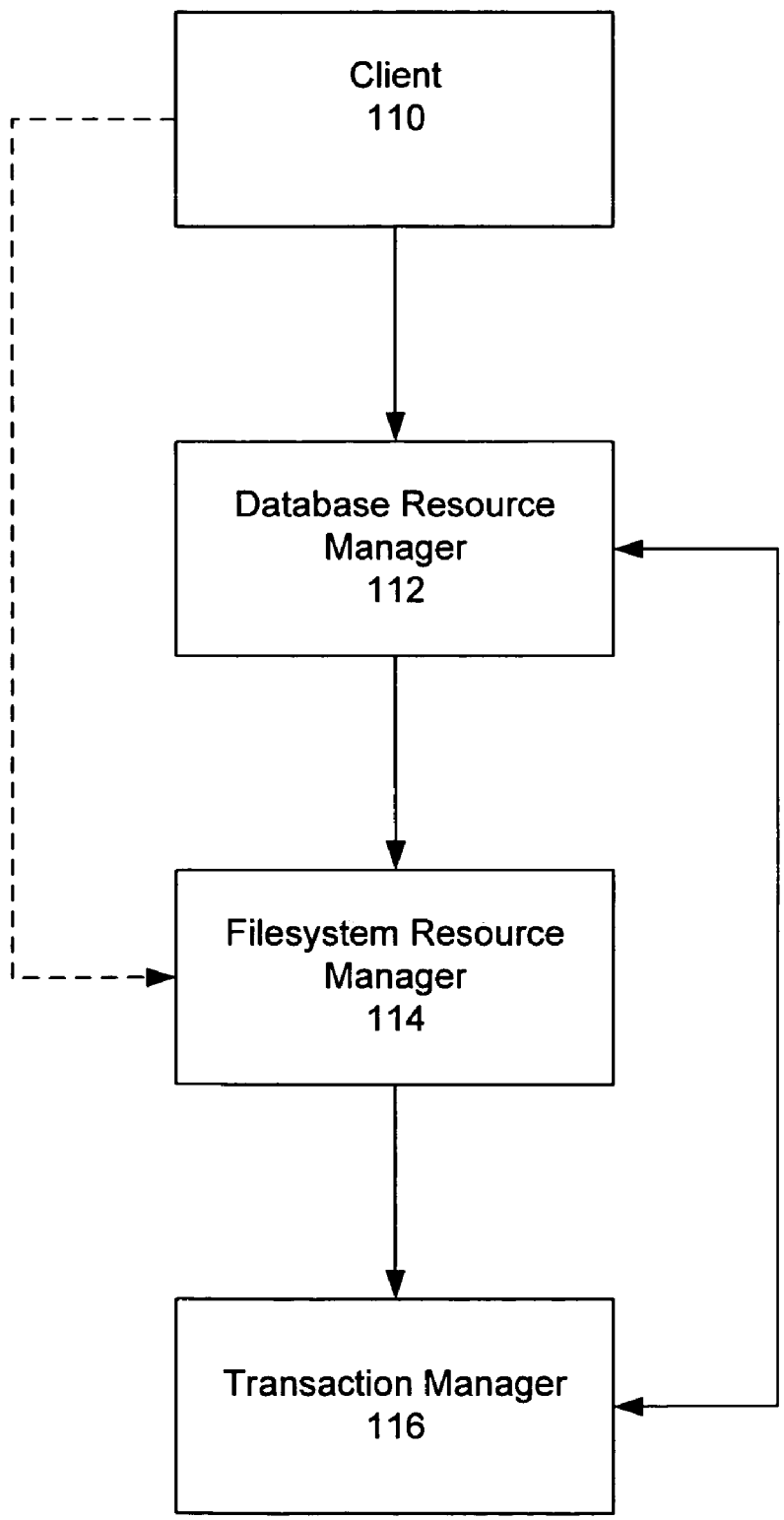
FIG. 1 depicts an exemplary database and filesystem coordinated transaction system in accordance with the present invention.

An exemplary database and filesystem coordinated transaction system in accordance with the present invention is shown in FIG. 1. Generally, database resource manager (DBRM) 112 provides access to an underlying database (DB) (not shown in FIG. 1). DBRM 112 may be, for example, a database server. DBRM 112 may receive and process queries and other commands to submit, retrieve, insert, delete, organize, change and otherwise modify and manipulate data within the DB. Filesystem resource manager (FSRM) 114 similarly provides access to a filesystem (not shown in FIG. 1). FSRM 114 may enable client 110 to create, delete, read from, write to, organize and otherwise modify and manipulate files stored by the FS.

Client 110 may communicate with DBRM 112 and/or FSRM 114 according to either an in-band scenario or an out-of-band scenario. In the out-of-band scenario, depicted by the dashed line shown in FIG. 1, client 110 interacts directly with both DBRM 112 and FSRM 114. Thus, in the out-of-band scenario, client 110 may submit data modifications directly to and receive modification results directly from FSRM 114. In the in-band scenario, client 110 communicates directly with DBRM 112 but not with FSRM 114. DBRM 112 serves as a conduit between client 110 and FSRM 114. Thus, in the in-band scenario, DBRM 112 submits data modifications to and receives modification results from FSRM 114 on behalf of client 110. The out-of-band scenario may commonly be employed when communicating with newer client applications that are capable of interacting directly with FSRM 114, while the in-band scenario may commonly be employed when communicating with older client applications that are not capable of interacting directly with FSRM 114.

To coordinate a transaction between DBRM 112 and FSRM 114, the present invention employs a transaction manager (TM) 116. TM 116 may provide a transaction handle that can be used to make data modifications within the transaction to the DB and the FS. Additionally, TM 116 enables DBRM 112 and FSRM 114 to enlist with the transaction. For each transaction, TM 116 may broadcast notifications of transaction related commands and events to the various resource managers which have enlisted in the transaction with TM 116. Thus, after DBRM 112 and FSRM 114 enlist with TM 116, TM 116 will send them a notification to prepare the resources necessary to commit the transaction, a command to commit the transaction, and a notification that the transaction has been successfully committed, has been rolled back, has been aborted, or is "in-doubt," meaning that TM 116 is unsure of the status of the transaction.

TM 116 may employ a two phase process for committing the transaction. The first phase of the process is a prepare phase in which TM 116 sends a command to each enlisted resource manager to prepare the resources necessary to commit the transaction. The second phase of the process is an execution phase, in which each enlisted resource manager is directed to attempt to commit the transaction. If, for any reason, any of the enlisted resource managers cannot commit its corresponding changes within the transaction, then the entire transaction will fail. If the transaction fails, then, for example, all changes with the transaction may be rolled back or one or more conflict resolution techniques may be employed to resolve conflicts between the changes within the transaction and other changes. A number of these conflict resolution techniques are well known in the art.

Each DB may have a unique TM 116 that is designated to manage transactions only for the particular DB. The use of a single TM 116 for each DB enables each DB to be recovered and restored independently of other DB's. An exemplary recovery process that may be employed in accordance with the present invention is described in detail below with reference to FIGS. 4-8. If a single transaction involves more than one DB, then the transaction may involve multiple corresponding TM's 116 with interactions coordinated amongst each other.

Figure 2A:
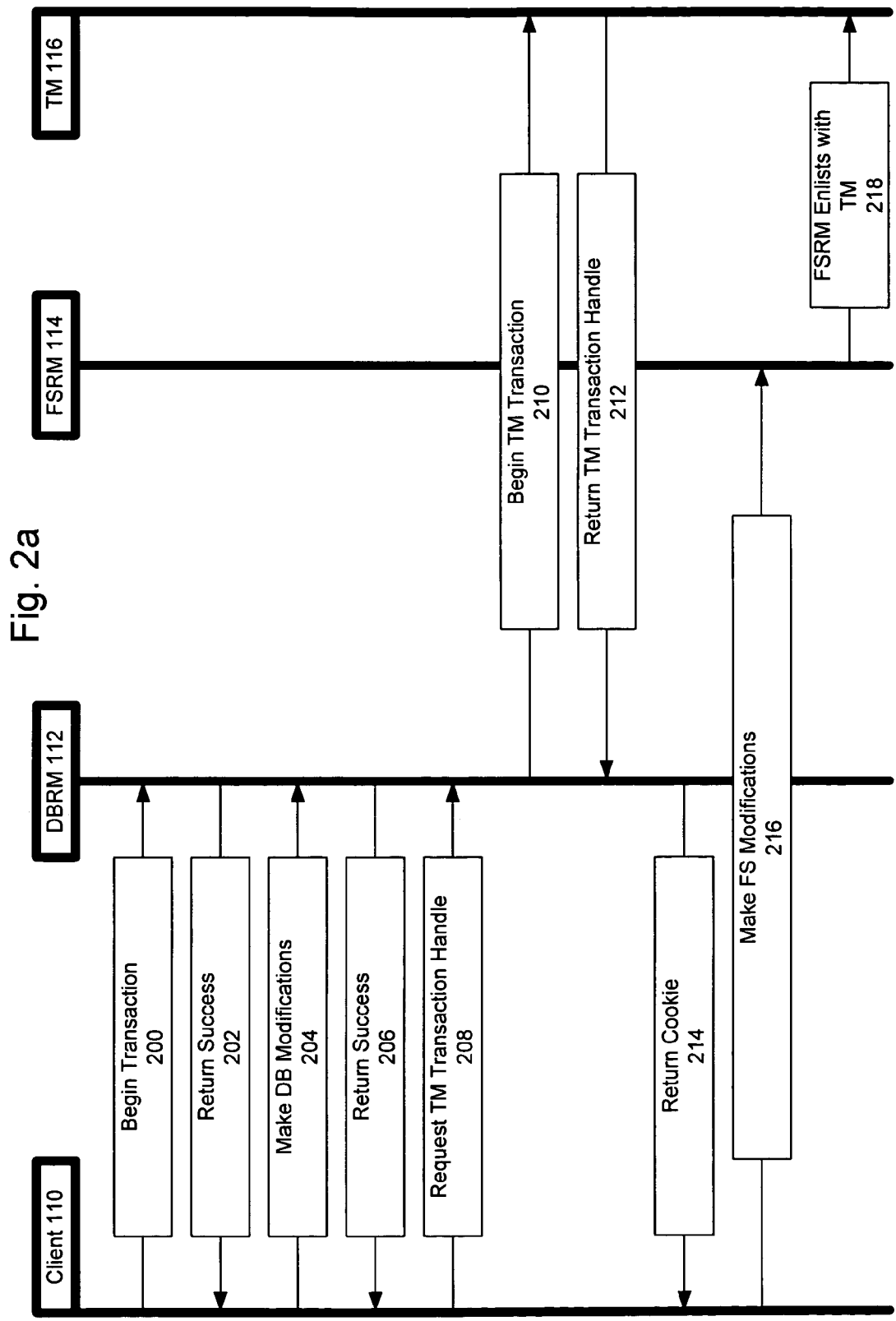

Exemplary methods for performing a filesystem and database coordinated transaction in accordance with the present invention are depicted in FIGS. 2a-b and 3a-b. Specifically, FIGS. 2a-b depict an exemplary out-of-band scenario in accordance with the present invention. As shown, in the exemplary out-of-band scenario, at act 200, client 110 sends a command to DBRM 112 to initiate the transaction, and, at act 202, DBRM 112 sends a reply to client 110 indicating that the transaction has been successfully initiated. At act 204, client 110 sends a set of one or more database modifications to DBRM 112. The modifications may be, for example, any number of insertions, deletions, and/or changes to the data within the DB. At act 206, DBRM 112 sends a reply to client 110 indicating that the database modifications have been successfully made (but not yet committed). As should be appreciated, client 110 may send any number of requests to DBRM 112 to make any number of database modifications within the transaction.

At act 208, client 110 sends a request to DBRM 112 for a transaction handle that can be used to make filesystem modifications. Prior to receiving the transaction handle request from client 110, DBRM 112 may be unsure whether or not the transaction will involve filesystem data. The transaction handle request from client 110 may, therefore, serve as an indication to DBRM 112 that the transaction will involve filesystem data. In response to the request, at act 210, DBRM 112 submits a command to TM 116 to initiate the transaction with TM 116.

Thus, the exemplary method of FIGS. 2a-b depicts a "lazy binding" process, in which DBRM 112 delays initiating the transaction with TM 116 until DBRM 112 has received an indication from client 110 that the transaction will involve at least some filesystem data. The lazy binding process avoids unnecessary enlistment with the transaction manager and also avoids the complexity involved with trying to predict whether the transaction will involve filesystem data. For example, if DBRM 112 initiated the transaction with TM 116 directly after the client transaction request at act 200, it would be possible that the transaction would not involve filesystem data and, therefore, that the involvement of TM 116 would be unnecessary.

After being contacted by DBRM 112, at act 212, TM 116 returns the requested transaction handle to DBRM 112. In turn, at act 214, DBRM 112 returns to client 110 a cookie that can be used to obtain the transaction handle. At act 216, client 110 obtains the transaction handle and uses it to submit a set of one or more filesystem modifications to FSRM 114. As should be appreciated, client 110 may send any number of requests to FSRM 114 to make any number of filesystem modifications. Upon receiving the filesystem modifications, at act 218, FSRM 114 enlists in the transaction with TM 116. At act 220, TM 116 returns an acknowledgement to FSRM 114 that the enlistment has succeeded. In turn, at act 222, FSRM 114 sends a reply to client 110 indicating that the filesystem modifications have been successfully made (but not yet committed).

When the transaction is ready to be committed, at act 224, client 110 sends a request to DBRM 112 to commit the transaction. At act 226, DBRM enlists in the transaction with TM 116, and, at act 228, TM 116 returns an acknowledgement to DBRM 112 that the enlistment has succeeded. After enlisting in the transaction, at act 230, DBRM 112 sends a command to TM 116 to commit the transaction. TM 116 then attempts to commit the transaction. TM 116 may employ the two phase commit process set forth above with respect to FIG. 1. At act 232, TM 116 sends a notification to DBRM indicating that the transaction has either been committed or rolled back. At act 234, DBRM passes the notification along to client 110.

Figure 3A:
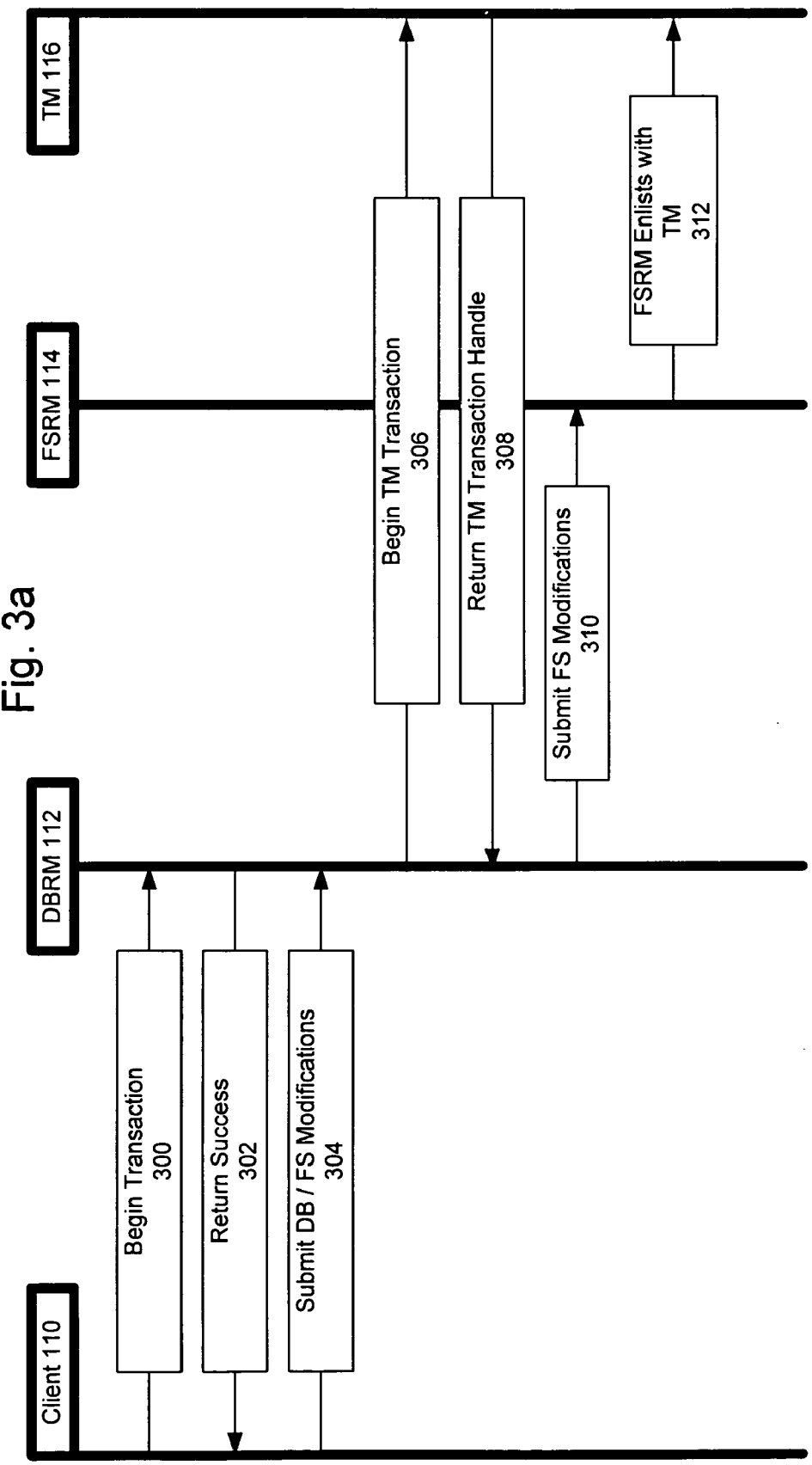
FIGS. 3a-b depict a flowchart of an exemplary method for performing an in-band coordinated transaction in accordance with the present invention.
Figure 3B:
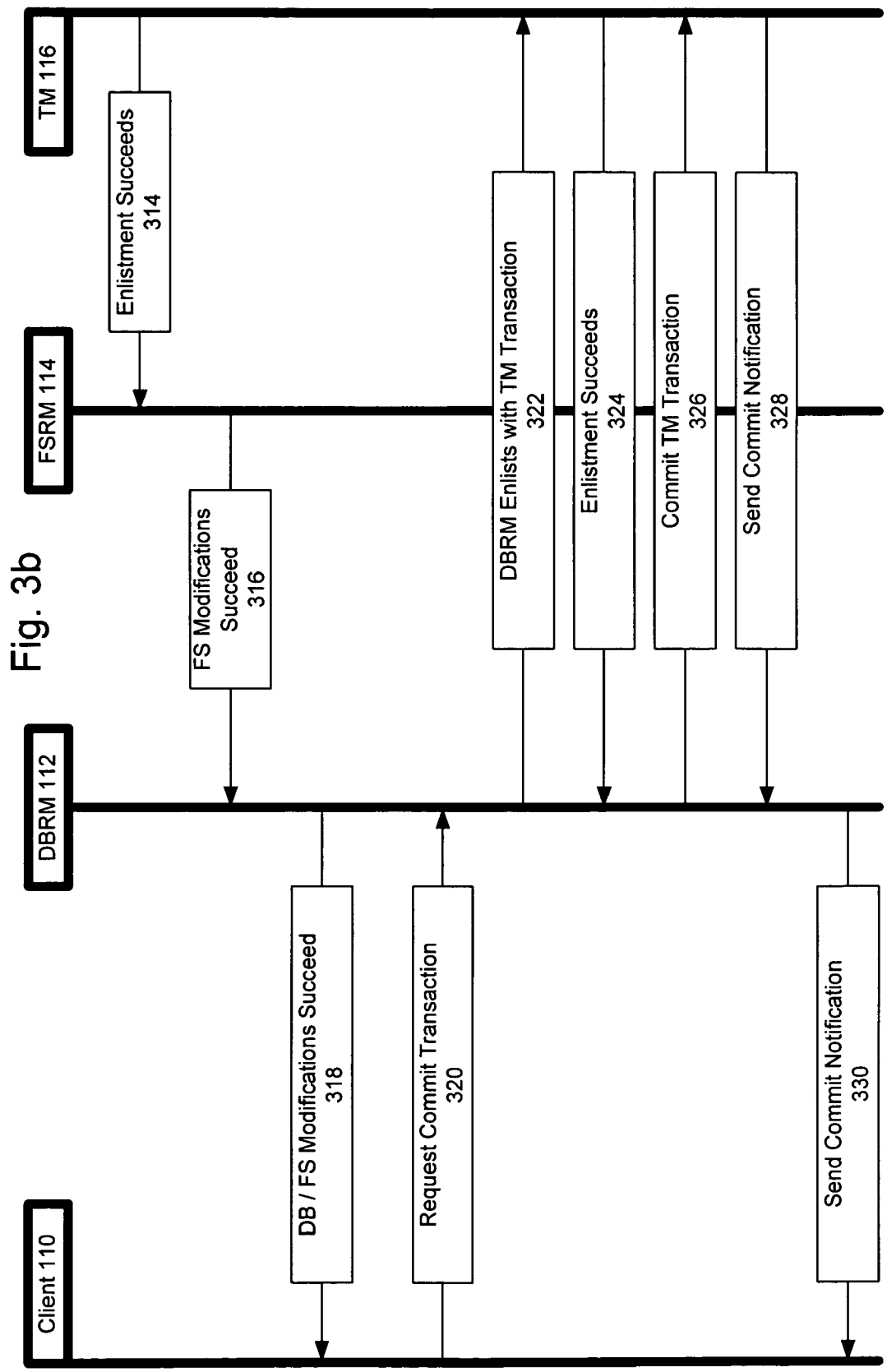

Accordingly, FIGS. 2a-b depict an exemplary out-of-band scenario database and filesystem coordinated transaction in accordance with the present invention. As depicted by acts 216 and 222, in the exemplary out-of-band scenario, client 110 communicates directly with FSRM 114. For clients 110 for which it would advantageous to avoid direct communication with FSRM 114, the present invention provides in-band transaction interactions, as depicted in FIGS. 3a-b. As shown, in the exemplary in-band scenario, at act 300, client 110 sends a command to DBRM 112 to initiate the transaction, and, at act 302, DBRM sends a reply to client 110 indicating that the transaction has been successfully initiated. At act 304, client 110 sends a set of at least one database and filesystem modifications to DBRM 112. The filesystem modification(s) may be modification(s) to data that is logically stored in the database and physically stored in the filesystem. As should be appreciated, client 110 may send any number of requests to DBRM 112 to make any number of database and filesystem modifications. The requests may be made separately or together in one or more commands.

Prior to receiving the database and filesystem modifications from client 110, DBRM 112 may be unsure whether or not the transaction will involve filesystem data. The database and filesystem modifications from client 110 may, therefore, serve as an indication to DBRM 112 that the transaction will involve filesystem data. In response to the request, at act 306, DBRM 112 submits a command to TM 116 to initiate the transaction with TM 116. Thus, similar to the exemplary out-of-band scenario of FIGS. 2a-b, the exemplary in-band scenario of FIGS. 3a-b also depicts a "lazy binding" process, in which DBRM 112 delays initiating the transaction with TM 116 until DBRM 112 has received an indication from client 110 that the transaction will involve at least some filesystem data.

After being contacted by DBRM 112, at act 308, TM 116 returns a transaction handle to DBRM 112. At act 310, DBRM 112 uses the transaction handle to submit the filesystem modifications to FSRM 114. Upon receiving the filesystem modifications, at act 312, FSRM 114 enlists in the transaction with TM 116. At act 314, TM 116 returns an acknowledgement to FSRM 114 that the enlistment has succeeded. At act 316, FSRM 114 sends a reply to DBRM 112 indicating that the filesystem modifications have been successfully made (but not yet committed). In turn, at act 318, DBRM 112 sends a reply to client 110 indicating that both the database and filesystem modifications have been successfully made (but not yet committed). When the transaction is ready to be committed, the commission process depicted in acts 320-330 is initiated in a similar process to that set forth above for acts 224-234 of FIGS. 2a-b.

In addition to coordinating transaction interactions, the present invention may also coordinate an overall recovery process for transactions which are in-doubt, meaning that it is uncertain whether or not the transactions have been committed. The coordination of the overall recovery process may be complicated by both DBRM 112 and TM 116 employing their own independent simultaneous and asynchronous recovery processes. Specifically, DBRM 112 may maintain information regarding each transaction which it believes to be in-doubt. This may include each transaction for which DBRM 112 received a prepare command from TM 116 but did not receive a corresponding commit command. Also, TM 116 may maintain information regarding each transaction which it believes to be in-doubt. This may include each transaction for which TM 116 submitted a prepare command to the enlisted resource managers but did not receive a corresponding ready to commit response.

To reconcile these independent simultaneous and asynchronous recovery processes, the present invention may employ a state machine driven recovery process between TM 116 and DBRM 112. Exemplary state machine tables in accordance with the present invention are shown in FIGS. 4 and 5. Specifically, FIG. 4 depicts an exemplary action table 400, that shows the corresponding actions for each current state input to the recovery process. FIG. 5 depicts an exemplary next state table 500, that shows the corresponding next state for each current state input to the recovery process. Additionally, FIG. 6 depicts a state symbol table 600 that provides a description for each state symbol in exemplary state tables 400 and 500. FIG. 7 depicts an input symbol table 700 that provides a description for each input symbol in exemplary state tables 400 and 500. FIG. 8 depicts an action symbol table 800 that provides a description for each action symbol in exemplary state tables 400 and 500. The state machine process maintains state for every transaction that either TM 116 believes to be in-doubt and/or DBRM 112 believes to be in-doubt. Employing a state machine driven process such as the exemplary process depicted in FIGS. 4-8 rather than, for example, a complex set of conditional statements, makes the recovery process less prone to coding errors and easier to maintain and modify. The tables and symbols depicted in FIGS. 4-8 merely provide an example of one possible state machine process and do not exclude other possible state machine implementations.

Accordingly, as set forth above with reference to FIGS. 1-8, the present invention provides systems and methods for database and filesystem coordinated transactions. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 9:
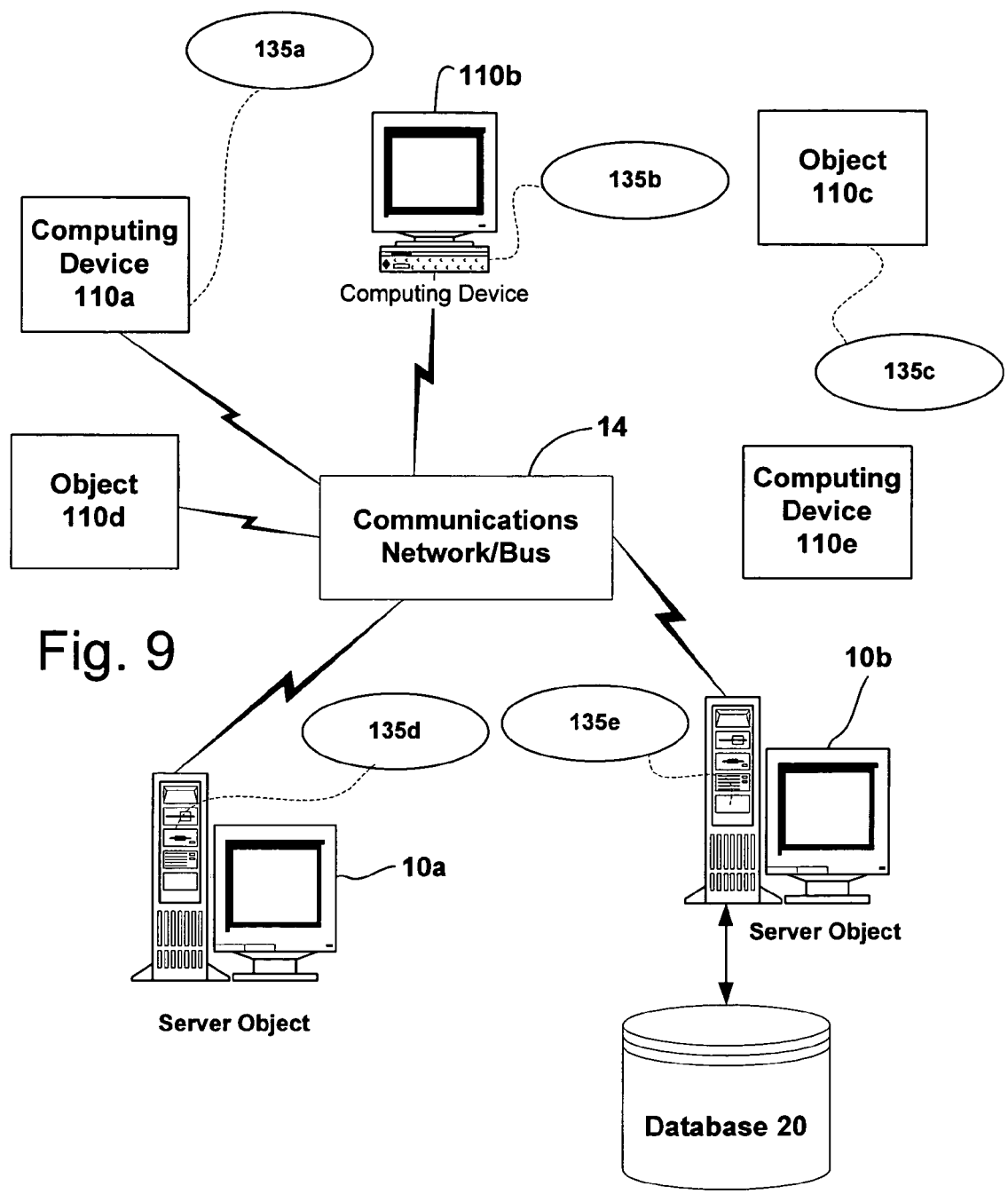
FIG. 9 is a block diagram representing an exemplary network environment having a variety of computing devices in which the present invention may be implemented.

FIG. 9 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 9, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over any available communications medium.

Thus, FIG. 9 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 9 and the following discussion are intended to provide a brief general description of a suitable computing device in connection with which the invention may be implemented. For example, any of the client and server computers or devices illustrated in FIG. 9 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 10:
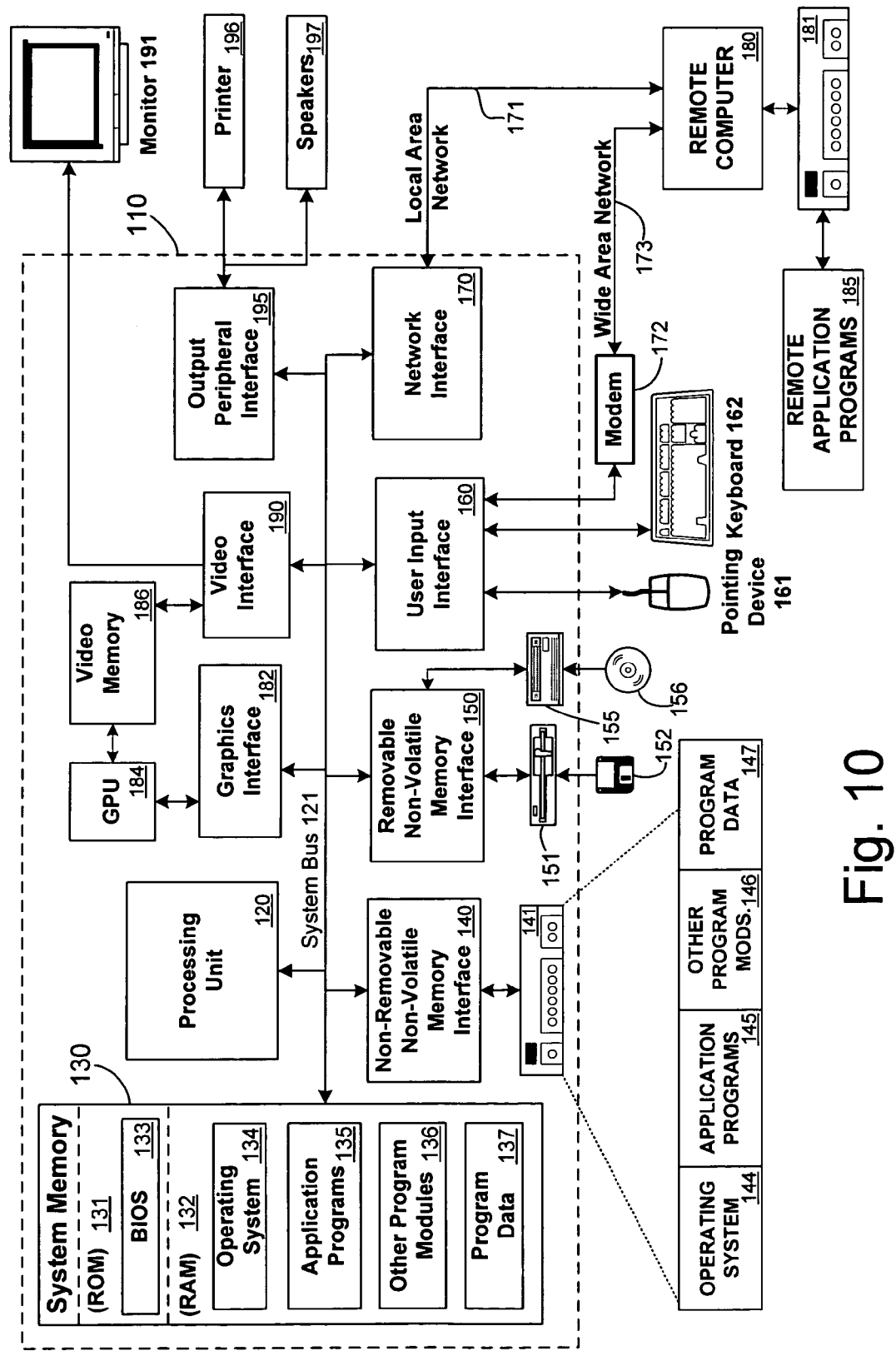
FIG. 10 is a block diagram of an exemplary representing an exemplary computing device in which the present invention may be implemented.

FIG. 10 thus illustrates an example of a suitable computing system environment 1000 in which the invention may be implemented, although as made clear above, the computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 9 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

CONCLUSION

Thus, systems and methods for database and filesystem coordinated transactions have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for performing a database and filesystem coordinated transaction, the method comprising:

receiving in a database resource manager a command from a client to initiate the transaction;

initiating the transaction with the database resource manager;

sending a first reply from the database resource manager to the client indicating successful initiation of the transaction;

receiving in the database resource manager from the client a set of at least one database modification;

delaying the initiating the transaction by the database resource manager with a transaction manager until the database resource manager receives an indication that the transaction involves both database data and filesystem data;

if the database resource manager does not receive the indication that the transaction involves both database data and filesystem data, processing the transaction without enlisting the transaction manager;

sending a second reply from the database resource manager to the client indicating that at least one database modification has been successfully made;

receiving in the database resource manager from the client a request for a transaction handle that is used to make at least one filesystem modification;

sending a command from the database resource manager to the transaction manager to initiate the transaction with the transaction manager only after the request for the transaction handle is received in the database resource manager;

receiving in the database resource manager from the transaction manager the transaction handle;

sending from the database resource manager to the client a cookie for obtaining the transaction handle;

receiving in a filesystem resource manager from the client a set of at least one filesystem modification;

in response to receiving the set of the at least one filesystem modification, enlisting the filesystem resource manager in the transaction with the transaction manager;

sending from the transaction manager to the filesystem resource manager an acknowledgment that the filesystem resource manager has successfully enlisted in the transaction;

sending a third reply from the filesystem resource manager to the client indicating that the at least one filesystem modification has been successfully made;

submitting an out-of-band filesystem modification within the transaction directly from the client to the filesystem resource manager;

sending an in-band filesystem modification within the transaction from the client to the database resource manager, which submits the in-band filesystem modification to the filesystem resource manager on behalf of the client;

receiving in the database resource manager a request from the client to commit the transaction;

enlisting the database resource manager in the transaction with the transaction manager;

sending from the transaction manager to the database resource manager an acknowledgment that the database resource manager has successfully enlisted in the transaction;

sending a command from the database resource manager to the transaction manager to commit the transaction;

receiving in the database resource manager from the transaction manager a notification that the transaction has been committed or rolled back; and sending the notification that the transaction has been committed or rolled back from the database resource manager to the client.

2. The method of claim 1, comprising initiating the transaction with the transaction manager that is unique to the database.

3. The method of claim 1, further comprising performing a two phase commit process having a first prepare phase in which resources associated with the transaction are acquired and a second execution phase in which an attempt is made to commit the transaction.

4. The method of claim 1, farther comprising performing a state machine driven recovery process to resolve transactions which are designated as in-doubt transactions by the database resource manager or the transaction manager.

5. A computer readable storage medium having computer executable instructions for performing a method to perform a database and filesystem coordinated transaction, the method comprising:

receiving in a database resource manager a command from a client to initiate the transaction;

initiating the transaction with the database resource manager;

sending a first reply from the database resource manager to the client indicating successful initiation of the transaction;

receiving in the database resource manager from the client a set of at least one database modification;

delaying the initiating the transaction by the database resource manager with a transaction manager until the database resource manager receives an indication that the transaction involves both database data and filesystem data;

if the database resource manager does not receive the indication that the transaction involves both database data and filesystem data, processing the transaction without enlisting the transaction manager;

sending a second reply from the database resource manager to the client indicating that at least one database modification has been successfully made;

receiving in the database resource manager from the client a request for a transaction handle that is used to make at least one filesystem modification;

sending a command from the database resource manager to a transaction manager to initiate the transaction with the transaction manager only after the request for the transaction handle is received in the database resource manager;

receiving in the database resource manager from the transaction manager the transaction handle;

sending from the database resource manager to the client a cookie for obtaining the transaction handle;

receiving in a filesystem resource manager from the client a set of at least one filesystem modification;

in response to receiving the set of the at least one filesystem modification, enlisting the filesystem resource manager in the transaction with the transaction manager;

sending from the transaction manager to the filesystem resource manager an acknowledgment that the filesystem resource manager has successfully enlisted in the transaction;

sending a third reply from the filesystem resource manager to the client indicating that the at least one filesystem modification has been successfully made;

submitting an out-of-band filesystem modification within the transaction directly from the client to the filesystem resource manager;

sending an in-band filesystem modification within the transaction from the client to the database resource manager, which submits the in-band filesystem modification to the filesystem resource manager on behalf of the client;

receiving in the database resource manager a request from the client to commit the transaction;

enlisting the database resource manager in the transaction with the transaction manager;
sending from the transaction manager to the database resource manager an acknowledgment that the database resource manager has successfully enlisted in the transaction;
sending a command from the database resource manager to the transaction manager to commit the transaction;
receiving in the database resource manager from the transaction manager a notification that the transaction has been committed or rolled back; and
sending the notification that the transaction has been committed or rolled back from the database resource manager to the client.

6. A system implemented in a computing environment for performing a database and filesystem coordinated transaction comprising:
a processor;
a memory;
receive in a database resource manager a command from a client to initiate the transaction;
initiate the transaction with the database resource manager;
send a first reply from the database resource manager to the client indicating successful initiation of the transaction;
receive in the database resource manager from the client a set of at least one database modification;
delay to initiate the transaction by the database resource manager with a transaction manager until the database resource manager receives an indication that the transaction involves both database data and filesystem data;
the transaction manager, which manages the transaction, is enlisted only when the database resource manager receives the indication that the transaction involves both database data and filesystem data;
send a second reply from the database resource manager to the client indicating that at least one database modification has been successfully made;
receive in the database resource manager from the client a request for a transaction handle that is used to make at least one filesystem modification;
send a command from the database resource manager to the transaction manager to initiate the transaction with the transaction manager only after the request for the transaction handle is received in the database resource manager;
receive in the database resource manager from the transaction manager the transaction handle;
send from the database resource manager to the client a cookie for obtaining the transaction handle;
receive in a filesystem resource manager from the client a set of at least one filesystem modification;
in response to receiving the set of the at least one filesystem modification, enlist the filesystem resource manager in the transaction with the transaction manager;
send from the transaction manager to the filesystem resource manager an acknowledgment that the filesystem resource manager has successfully enlisted in the transaction;
send a third reply from the filesystem resource manager to the client indicating that the at least one filesystem modification has been successfully made;
submit an out-of-band filesystem modification within the transaction directly from the client to the filesystem resource manager;
send an in-band filesystem modification within the transaction from the client to the database resource manager, which submits the in-band filesystem modification to the filesystem resource manager on behalf of the client;
receive in the database resource manager a request from the client to commit the transaction;
enlist the database resource manager in the transaction with the transaction manager;
send from the transaction manager to the database resource manager an acknowledgment that the database resource manager has successfully enlisted in the transaction;
send a command from the database resource manager to the transaction manager to commit the transaction;
receive in the database resource manager from the transaction manager a notification that the transaction has been committed or rolled back; and
send the notification that the transaction has been committed or rolled back from the database resource manager to the client.

7. The system of claim 6, wherein the transaction manager is unique to the database.

8. The system of claim 6, wherein the database resource manager performs a state machine driven recovery process to resolve transactions which are designated as in-doubt transactions by the database resource manager or the transaction manager.

9. The system of claim 6, wherein the transaction manager performs a two phase commit process having a first prepare phase in which resources associated with the transaction are acquired and a second execution phase in which an attempt is made to commit the transaction.

* * * * *

UNITED STATES PATENT AND TRADEMARK OFFICE
CERTIFICATE OF CORRECTION

PATENT NO. : 7,478,115 B2　　　　　　　　　　　　　　　　　　　　　　　　　Page 1 of 1
APPLICATION NO. : 11/151378
DATED : January 13, 2009
INVENTOR(S) : Michael J. Purtell et al.

It is certified that error appears in the above-identified patent and that said Letters Patent is hereby corrected as shown below:

In column 14, line 4, in Claim 4, delete "farther" and insert -- further --, therefor.

Signed and Sealed this
Twenty-sixth Day of April, 2011

David J. Kappos
*Director of the United States Patent and Trademark Office*